US010361910B2

(12) United States Patent
Cheloff

(10) Patent No.: US 10,361,910 B2
(45) **Date of Patent: *Jul. 23, 2019**

(54) SYSTEMS AND METHODS FOR CONFIGURING A MANAGED DEVICE USING AN IMAGE

(71) Applicant: Connectwise, Inc., Tampa, FL (US)

(72) Inventor: Brett Alan Cheloff, Tampa, FL (US)

(73) Assignee: Connectwise, LLC, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/835,196

(22) Filed: Dec. 7, 2017

(65) Prior Publication Data

US 2018/0102940 A1 Apr. 12, 2018

Related U.S. Application Data

(63) Continuation of application No. 14/089,679, filed on Nov. 25, 2013, now Pat. No. 9,843,475.

(Continued)

(51) Int. Cl.

*G06Q 20/32* (2012.01)
*H04L 12/24* (2006.01)

(52) U.S. Cl.

CPC ..... *H04L 41/0803* (2013.01); *G06Q 20/3274* (2013.01); *G06Q 20/3276* (2013.01); *G06Q 20/3278* (2013.01)

(58) Field of Classification Search

CPC .... G06Q 20/3276; G06Q 20/14; G06Q 20/32; G06Q 20/322; G06F 17/30879; H04L 29/06; H04L 61/30; H04L 67/04

See application file for complete search history.

(56) References Cited

U.S. PATENT DOCUMENTS

| | | |
|---|---|---|
| 6,225,938 B1 | 5/2001 | Hayes et al. |
| 7,353,995 B2 | 4/2008 | Strickland |

(Continued)

FOREIGN PATENT DOCUMENTS

| | | |
|---|---|---|
| EP | 2 364 043 | 7/2011 |
| EP | 2 385 480 | 11/2011 |

(Continued)

OTHER PUBLICATIONS

Wikimedia Foundation, Wikipedia article on QR code, captured Nov. 1, 2013, San Francisco, California.

(Continued)

*Primary Examiner* — Ninos Donabed
(74) *Attorney, Agent, or Firm* — Foley & Lardner LLP

(57) ABSTRACT

Systems and methods of the present disclosure can facilitate managing a computing device. The computing device can be a managed device that is managed by a device management server. In some embodiments, the system includes a generation module and an interface module. The generation module may be configured to receive a site location for the computing device, identify an address of the device management server, and generate an optical representation of a configuration based on the site location and the address. The interface module may be configured to provide the optical representation to the computing device and receive a communication from the computing device, the communication corresponding to the configuration.

20 Claims, 14 Drawing Sheets

Related U.S. Application Data

(60) Provisional application No. 61/735,021, filed on Dec. 9, 2012.

(56) References Cited

U.S. PATENT DOCUMENTS

| | | | | |
|---|---|---|---|---|
| 7,438,217 | B2 | 10/2008 | Bhella et al. | |
| 7,505,928 | B2 | 3/2009 | Lebaschi | |
| 7,812,995 | B2 | 10/2010 | Braswell et al. | |
| 8,983,858 | B2 * | 3/2015 | Evans | G06Q 30/0201 705/14.39 |
| 9,544,143 | B2 * | 1/2017 | Oberheide | H04L 9/32 |
| 2002/0155843 | A1 * | 10/2002 | Bahl | H04W 4/02 455/456.1 |
| 2005/0075940 | A1 | 4/2005 | Deangelis | |
| 2005/0149765 | A1 | 7/2005 | Aldstadt et al. | |
| 2005/0234931 | A1 | 10/2005 | Yip et al. | |
| 2006/0271552 | A1 | 11/2006 | McChesney et al. | |
| 2007/0136573 | A1 * | 6/2007 | Steinberg | G06F 21/32 713/155 |
| 2008/0266174 | A1 | 10/2008 | Medina Herrero | |
| 2011/0106613 | A1 | 5/2011 | Felt et al. | |
| 2011/0112943 | A1 | 5/2011 | Dietz et al. | |
| 2011/0219230 | A1 * | 9/2011 | Oberheide | H04L 9/32 713/168 |
| 2012/0036226 | A1 * | 2/2012 | Chor | G06F 17/30879 709/219 |
| 2012/0089713 | A1 | 4/2012 | Carriere | |
| 2012/0154130 | A1 | 6/2012 | Liu | |
| 2012/0158919 | A1 | 6/2012 | Aggarwal et al. | |
| 2012/0158922 | A1 * | 6/2012 | Aggarwal | H04L 63/104 709/220 |
| 2012/0210268 | A1 | 8/2012 | Hilbrink et al. | |
| 2012/0241516 | A1 * | 9/2012 | Zuleeg | G06F 17/30879 235/375 |
| 2013/0071029 | A1 | 3/2013 | Terwilliger et al. | |
| 2013/0173335 | A1 * | 7/2013 | Evans | G06Q 30/0201 705/7.29 |
| 2013/0173336 | A1 * | 7/2013 | Evans | G06Q 30/0201 705/7.29 |
| 2013/0173337 | A1 * | 7/2013 | Evans | G06Q 30/0201 705/7.29 |
| 2013/0268128 | A1 | 10/2013 | Casilli et al. | |
| 2015/0073927 | A1 | 3/2015 | Reblin | |
| 2015/0149562 | A1 | 5/2015 | Aviv | |

FOREIGN PATENT DOCUMENTS

| | | |
|---|---|---|
| EP | 2 575 291 | 8/2013 |
| WO | WO-2010/097618 | 9/2010 |
| WO | WO-2013/046231 | 4/2013 |

OTHER PUBLICATIONS

Buildwatch project, Setup BuildWatch and Jenkins Cloud Messaging Notifications, captured Nov. 2, 2013, Cologne, Germany.

Denso ADC, QR Code Essentials, 2011, Kariya, Aichi prefecture, Japan.

Gervasio, Paulo, editor, Wiki for Coding QR Code Mobile Apps, captured Nov. 1, 2013, Maragusan, Compostela Valley, Philippines.

GitHub Buildwatch project, Initial commit, captured Nov. 2, 2013, San Francisco, California.

Hewlett Packard, HP iLO Mobile Application for iOS User Guide, part No. 689175-002, May 2012, Palo Alto, California.

Kuntze, Nicolai, Demo: Zero touch configuration, IFIP/IEEE International Symposium on Integrated Network Management, May 2013, Ghent, Belgium.

Kuntze, Nicolai, On the automatic establishment of security relations for devices, IFIP/IEEE International Symposium on Integrated Network Management, May 2013, Ghent, Belgium.

LabTech, LabTech Adds Complete, Powerful, Integrated Mobile Device Management for Apple iOS and Google Android, Apr. 26, 2012, Tampa, Florida.

LabTech, LabTech Software Releases Updates and Enhancements for Industry Leading Remote Monitoring and Management Platform, Dec. 10, 2012, Tampa, Florida.

Landesk Software, What's new in Avalanche(AOD) after Maintenance Update—version 4, captured Nov. 2, 2013, South Jordan, Utah.

Landesk Software, What's New in this Version, captured Nov. 2, 2013, South Jordan, Utah.

Maharadroid project, End user home page, captured Oct. 30, 2013, Mountain View, California.

Maharadroid project, Project home page, captured Oct. 30, 2013, Mountain View, California.

Maharadroid project, QR code configuration wiki, captured Oct. 30, 2013, Mountain View, California.

Maharadroid project, QR code source checkin, captured Oct. 30, 2013, Mountain View, California.

Microsoft Corporation, Pair an authenticator app with your Microsoft account, captured Nov. 2, 2013, Redmond, Washington.

Mobile Nations, How to set up and start using BBM for iPhone, Oct. 21, 2013, Inverness, Florida.

National Barcode, Facts About Barcode Scanners, captured Nov. 2, 2013, Chicago, Illinois.

Saxena, Nitesh, et. al., Secure Device Pairing Based on a Visual Channel: Design and Usability Study, IEEE Transactions on Information Forensics and Security, Mar. 2011, Brooklyn, New York.

U.S. Notice of Allowance on U.S. Appl. No. 14/089,679 dated Aug. 10, 2017.

U.S. Office Action on U.S. Appl. No. 14/089,679 dated Mar. 24, 2016.

U.S. Office Action on U.S. Appl. No. 14/089,679 dated Sep. 8, 2015.

U.S. Office Action on U.S. Appl. No. 14/089,679 dated Nov. 14, 2016.

U.S. Office Action on U.S. Appl. No. 14/089,679 dated Apr. 12, 2017.

Bandh, Tobias, et. al., Automatic site identification and hardware-to-site mapping for base station self-configuration, IEEE 73rd Vehicular Technology Conference, May 2011, Budapest, Hungary.

* cited by examiner

SYSTEMS AND METHODS FOR CONFIGURING A MANAGED DEVICE USING AN IMAGE

CROSS-REFERENCE TO RELATED PATENT APPLICATIONS

This application claims priority to and is a continuation of U.S. patent application Ser. No. 14/089,679, titled "SYSTEMS AND METHODS FOR CONFIGURING A MANAGED DEVICE USING AN IMAGE" filed on Nov. 25, 2013 which in turn claims the benefit of U.S. Provisional Patent Application No. 61/735,021, titled "CONFIGURING A STANDARD MANAGEMENT APPLICATION INSTALLATION USING AN ENCODED IMAGE," filed on Dec. 9, 2012, each of which are hereby incorporated by their entirety.

FIELD OF THE DISCLOSURE

The present disclosure generally relates to managing computing devices. More specifically, the present disclosure relates to using an image to configure the management of a computing device.

BACKGROUND OF THE INVENTION

A device management system can be used to manage a variety of computing devices. When adding a new computing device to be managed, the computing device may be configured to work with the device management system.

SUMMARY OF THE INVENTION

A device management system can be used to facilitate the management of computing devices. The management of these computing devices, which can be managed devices that are managed by a device management server, can be outsourced to a Managed Service Provider (MSP). This outsourcing may facilitate controlling costs and maintaining a higher level of service for end users. MSPs may be able to use a device management system to centralize management functions and leverage the expertise of a small but competent team of technicians.

The variety of different types of managed devices may increase the difficulty of setting up and configuring software used for device management. Some managed devices, such as laptops, tablets, and smart phones, may be outside a corporate network, and as a result, standard mechanisms for distributing, installing, and configuring software may not be available for use on these managed devices. Therefore, the end user of the managed device may be required to run the software installation on it.

Faced with this situation, the vendors of device management systems may provide MSPs with a facility to create a custom installer that can incorporate a configuration for the software used for device management. In this way, the MSP can create a separate installation for each customer, or for each group of managed devices to be managed similarly. Then, the MSP may choose to use a web site, or physical transmission of media, to provide the appropriate installation to each customer. In this way, the end user can run the installation, which can then install and correctly configure the management software on the managed device with no additional input from the end user.

This approach may not always be possible. Some managed devices, such as smart phones, may be restricted to only allow installation of software using an "app store" operated by the vendor of the managed device. The vendor may require an acceptance process before allowing software to be distributed through the app store, and the vendor may not even allow some types of software. It may not be desirable, or even feasible, for an MSP to provide custom installations to end users through an app store. The MSPs may desire a method for distributing a single installation to all end users, but have a convenient way to create and distribute to end users different configurations of the managed devices, and may want the end users to be able to apply these configurations with little or no effort and without errors.

At least one aspect of the present disclosure is directed to a method for managing a computing device. The computing device can be a managed device that is managed by a device management server. In some embodiments, the method includes receiving, by a generation module executing on a device management server, a site location for the computing device. The method can include the generation module identifying an address of the device management server. The method can include the generation module generating an optical representation of a configuration corresponding to the site location and the address. In some embodiments, the method includes providing to the computing device, by an interface module running on the device management server, the optical representation of the configuration. The method can include the interface module receiving, from the computing device, a communication corresponding to the configuration.

In some embodiments, the method includes a scanning module reading the optical representation of the configuration. The scanning module may be communicatively coupled to the computing device. In some embodiments, the method includes the computing device determining, based on the optical representation of the configuration, the configuration. The method may include the computing device storing, in a memory element of the computing device, the configuration.

In some embodiments, the method includes the generation module accessing a data structure that includes the site location and an entity. In some embodiments, the entity includes a business unit such as a business office location. In some embodiments, the entity corresponds to a group of one or more computing devices.

In some embodiments, the address includes at least one of an IP address, a domain name, a URL, and a machine name. In some embodiments, the optical representation includes at least one of a QR code, a one-dimensional barcode, a stacked barcode, a two-dimensional barcode, a Data Matrix code, a steganographic image, an Aztec code, a high capacity color barcode, a MaxiCode, and a SPARQcode.

In some embodiments, the providing of the optical representation of the configuration to the computing devices includes at least one of displaying the optical representation on a web page, embedding the optical representation in an email message, embedding the optical representation in a multimedia message service (MMS) message, and printing the optical representation on a physical medium.

In some embodiments, the communication corresponding to the configuration includes at least one of an acknowledgement message, the site location, a device identifier for the computing device, one or more of a hardware configuration of the computing device, and one or more of a software configuration for the computing device.

At least one aspect of the present disclosure is directed to a system for managing a computing device. The computing device can be a managed device that is managed by a device management server. In some embodiments, the system includes, executing on the device management server, a generation module and an interface module. The generation module can be configured to receive a site location for the computing device, identify an address of the device management server, and generate an optical representation of a configuration based on the site location and the address. The interface module can be configured to provide the optical representation to the computing device, and receive a communication from the computing device, the communication corresponding to the configuration.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
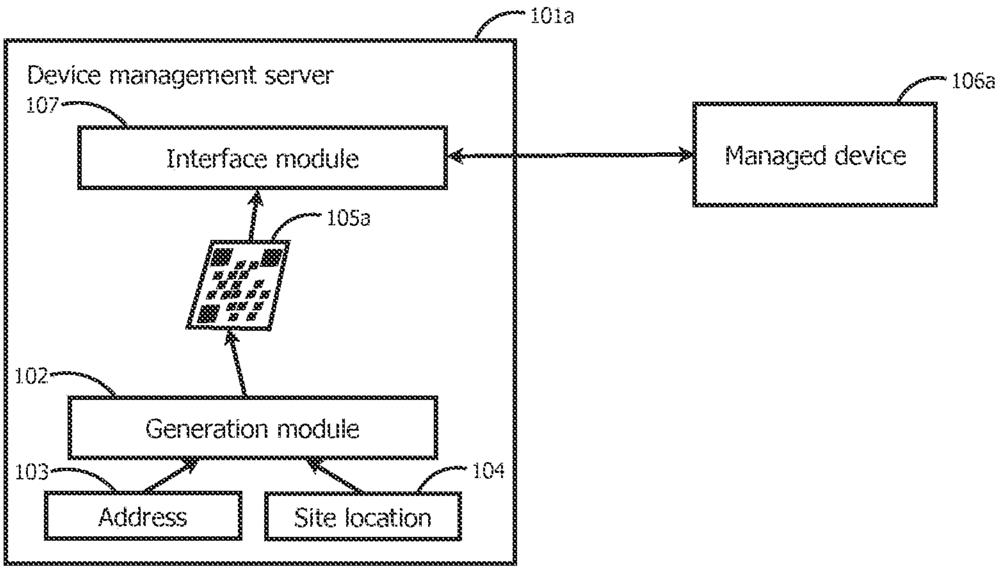
FIG. 1 is an illustrative block diagram of an example embodiment of a system for configuring a managed device using an optical representation of a configuration.

Systems and methods of the present disclosure can facilitate managing a computing device. The computing device can be a managed device that is managed by a device management server. The managed devices can be organized into locations, which may facilitate the management function by allowing managed devices at the same location to be managed in similar ways. For example, the locations may be organized around business entities that utilize the managed devices. The managed devices can also be organized into arbitrary groups, which may also facilitate the management function by allowing managed devices in the same group to be managed in similar ways. For example, one group might contain all the managed devices that are mail servers, and may therefore be conveniently managed in ways that are specific to mail servers.

The managed devices may run management software to facilitate the implementation of the management function. The management software may contact the device management server periodically to check for commands and return status information. The management software may therefore need to have the address for contacting the device management server. Additionally, the management software may also need to have a unique identifier with which to identify the managed device to the device management server. In addition, the management software may need to communicate the location of the managed device to the device management server, in order to facilitate the organization of managed devices by the device management server. Additionally, the management software may need to communicate information about the groups for the managed device to the device management server, in order to facilitate the organization of managed devices by the device management server. All of this information that may be needed by the management software can be represented in a configuration that can be used during the setup of the management software.

A generation module executing on the device management server can combine the address of the device management server and the location for a set of managed devices associated with a particular entity such as a business unit, and create a configuration with this address and location. The generation module can create an optical representation of the configuration, such as a QR code containing the information in the configuration. The optical representation can be communicated to the end user in charge of setting up the managed devices associated with the entity. The optical representation can be scanned by the managed device during the setup of the management software, and the scan can be used to determine the configuration information. The configuration information can be used to update the configuration of the managed software stored on the managed device. The address in the configuration can facilitate the managed device in communicating with the device management server. The location in the configuration can be communicated from the managed device to the device management server, and can facilitate the device management server in organizing the managed device in the correct location, along with other managed devices in that same location.

In an illustrative example, an MSP may have a number of customers, including a large customer with several offices in different cities. The MSP may decide to set up the device management server to manage each city office as a unit, and may want to have a separate location for each city office. The MSP can set up a location for the Tampa office, and can use the device management server to generate a QR code with the configuration for all the managed devices in the Tampa office. The device management server can generate a location identification such as "23" for the Tampa office, and can include the location identification 23 in the configuration QR code. It can also include the domain name of the device management server, such as "joesmsp.com", in the configuration QR code. The device management server can set up a page, such as "http://tampa.joesmsp.com/", to display the configuration QR code, along with a second QR code that is a link to the app store page for the management software, and instructions on how to use the two QR codes. The MSP can send an email to the office manager at the Tampa office with a link to the page "http://tampa.joesmsp.com/". The office manager in the Tampa office can forward the email to all employees with smart phones. An employee can read the email with an email client and follow the link with a browser, and may see the page with the instructions. The employee can use the QR code scanner app on a smart phone to scan the second QR code, receive the management software from the app store, install the management software, and run the management software. The management software can provide instructions to scan the configuration QR code. The employee can scan the configuration QR code, and the management software can extract and store the configuration. The management software can establish communications with the device management server using the address "joesmsp.com". The management software can generate a unique device identifier for the managed device, and can send the unique device identifier and the location identification 23 to the device management server. The device management server can configure the information for the new managed device in the Tampa office, and may now be ready to offer management functions for that managed device.

FIG. 1 is an illustrative block diagram of an example embodiment of a system for configuring a managed device using an optical representation of a configuration, such as an image. A generation module 102 executing on a device management server 101*a* can incorporate an address 103 and a site location 104 into an optical representation 105*a* of a configuration. An interface module 107 executing on the device management server 101*a* can provide the optical representation 105*a* to a managed device 106*a*. The managed device 106*a* can send a communication to the interface module 107, where the communication corresponds to the configuration generated from the address 103 and the site location 104. The generation module 102 and the interface module 107 may be one or more software modules, a combination of software modules, one or more Application Programming Interfaces (APIs), a combination of APIs, or other implementations known to one skilled in the art.

The managed device 106*a* may communicate with the device management server 101*a* through a network. The network can include a local-area network (LAN), such as a company Intranet, a metropolitan area network (MAN), or a wide area network (WAN), such as the Internet or the World Wide Web. In some embodiments, there are multiple networks between the devices and the servers. In one of these embodiments, the network may be a public network, a private network, or may include combinations of public and private networks.

The network may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. The topology of the network may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data may be transmitted via different protocols. In other embodiments, the same types of data may be transmitted via different protocols.

The one or more device management servers 101*a*-101*m* do not need to be physically proximate to each other or in the same machine farm. Thus, the servers logically grouped as a machine farm may be interconnected using a wide-area network (WAN) connection or a metropolitan-area network (MAN) connection. For example, a machine farm may include servers physically located in different continents or different regions of a continent, country, state, city, campus, or room. Data transmission speeds between servers in the machine farm can be increased if the servers are connected using a local-area network (LAN) connection or some form of direct connection.

Management of the servers may be de-centralized. For example, one or more servers may comprise components, subsystems and circuits to support one or more management services. In one of these embodiments, one or more servers provide functionality for management of dynamic data, including techniques for handling failover, data replication, and increasing robustness. Each server may communicate with a persistent store and, in some embodiments, with a dynamic store.

A server may include a file server, application server, web server, proxy server, appliance, network appliance, gateway, gateway, gateway server, virtualization server, deployment server, secure sockets layer virtual private network ("SSL VPN") server, or firewall. In one embodiment, the server may be referred to as a remote machine or a node. In one embodiment, the server may be referred to as a cloud.

The system and its components, such as a device management server 101*a*, a managed device 106*a*, and modules 102 and 107, may include hardware elements, such as one or more processors, logic devices, or circuits. For example, the system and its components may include a bus or other communication component for communicating information and a processor or processing circuit coupled to the bus for processing information. The hardware elements can also include one or more processors or processing circuits coupled to the bus for processing information. The system also includes main memory, such as a random access memory (RAM) or other dynamic storage device, coupled to the bus for storing information, and instructions to be executed by the processor. Main memory can also be used for storing position information, temporary variables, or other intermediate information during execution of instructions by the processor. The system may further include a read only memory (ROM) or other static storage device coupled to the bus for storing static information and instructions for the processor. A storage device, such as a solid state device, magnetic disk or optical disk, can be coupled to the bus for persistently storing information and instructions.

The system and its components, such as a device management server 101*a*, a managed device 106*a*, and modules 102 and 107, may include, e.g., computing devices, desktop computers, laptop computers, notebook computers, mobile or portable computing devices, tablet computers, smart phones, personal digital assistants, or any other computing device.

According to various embodiments, the processes described herein can be implemented by the system or hardware components in response to the one or more processors executing an arrangement of instructions contained in memory. Such instructions can be read into memory from another computer-readable medium, such as a storage device. Execution of the arrangement of instructions contained in memory causes the system to perform the illustrative processes described herein. One or more processors in a multi-processing arrangement may also be employed to execute the instructions contained in memory. In alternative embodiments, hard-wired circuitry may be used in place of or in combination with software instructions to effect illustrative embodiments. Thus, embodiments are not limited to any specific combination of hardware circuitry and software. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 2:
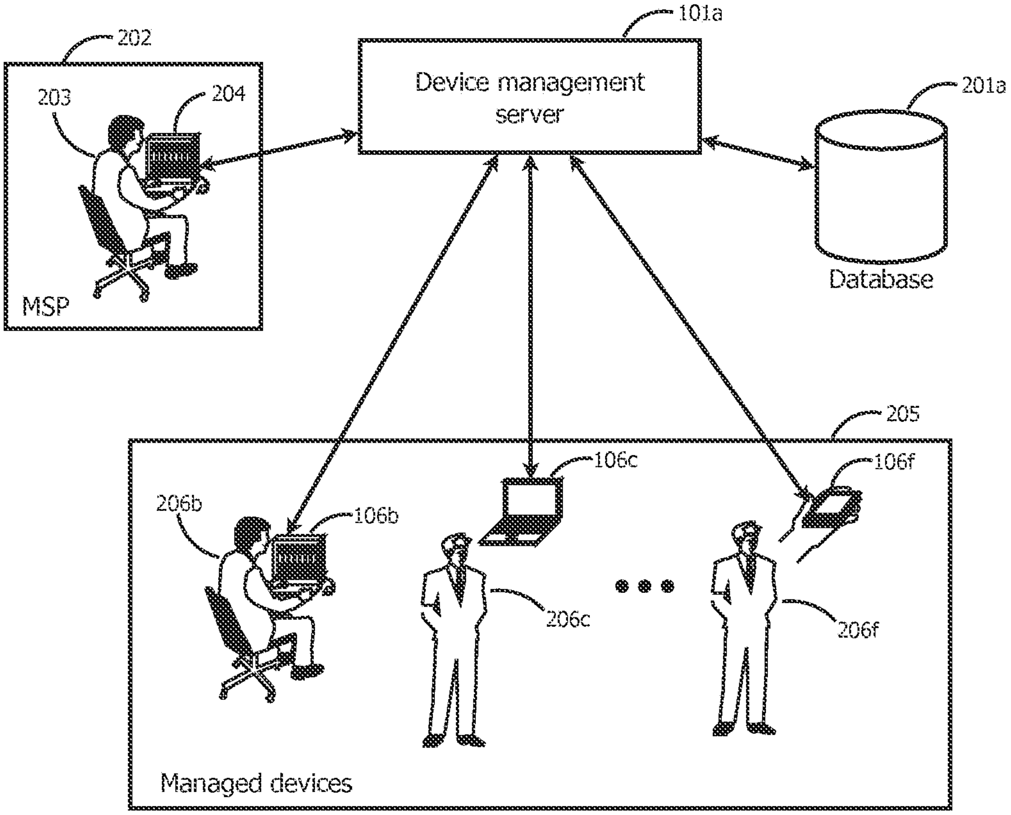
FIG. 2 is an illustrative block diagram of an example embodiment of a device management server and managed devices.

FIG. 2 is an illustrative block diagram of an embodiment of a device management server and managed devices. A technician 203 at an MSP 202 can use a device 204 to access the device management server 101*a*. The device management server 101*a* may be connected to a database 201*a* that can be used for storing information needed to provide the monitoring and management functions. A collection of managed devices 205 can be monitored and managed by the MSP 202. These managed devices can be any sort of computers or computing equipment. By way of example, FIG. 2 illustrates an example of a desktop machine 106*b*, a laptop 106*c*, and a mobile device 106*f*. Each managed device 106*b*-106*f* may be used by an end user 206*b*-206*f* who may benefit from the monitoring and management functions. Each managed device 106*b*-106*f* can connect to the device management server 101*a* to retrieve and execute management functions and to report monitoring results.

Figure 3A:
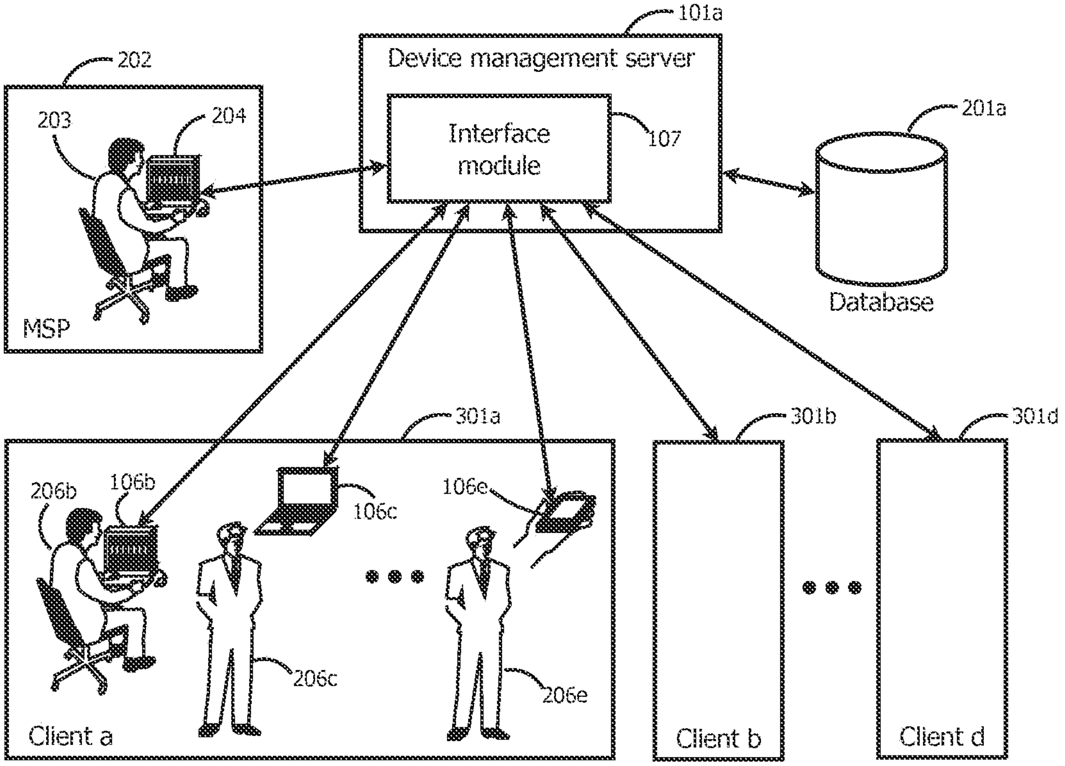
FIG. 3A is an illustrative block diagram of an example embodiment of a device management server and managed devices at multiple clients.

FIG. 3A is an illustrative block diagram of an example embodiment of a device management server and managed devices at multiple clients. The device 204 can be configured to communicate with the interface module 107 on the device management server 101*a*. For example, a technician 203 at an MSP 202 can use the device 204 to communicate with the interface module 107 on the device management server 101*a*. The device management server 101*a* can be configured to provide monitoring and management functions to managed devices 106*b*-106*f*, as seen with respect to FIG. 2. Each client 301*a*-301*d* may have one or more managed devices 106*a*-106*f*. By way of example, FIG. 3A illustrates this for client 301*a* with managed devices 106*b*-106*e*, with managed device 106*b* exemplified as a desktop machine, managed device 106*c* exemplified as a laptop machine, and managed device 106*e* exemplified as a mobile device. Each managed device 106*b*-106*e* may be used by an end user 206*b*-206*e* who may benefit from the monitoring and management functions. Each managed device 106*b*-106*e* can connect to the interface module 107 on the device management server 101*a* to retrieve and execute management functions and to report monitoring results. This structure may be similar at all clients 301*a*-301*d*. The database 201*a* can be used to keep track of the partitioning of managed devices by client 301*a*-301*d*, as will be seen with respect to FIG. 3B. The device management server 101*a* may use the database 201*a* to help the technician 203 visualize activities by clients 301*a*-301*d*, and may also facilitate management of the clients 301*a*-301*d*. The device management server 101*a* may also facilitate the MSP 202 in consolidating actions on and results from clients 301*a*-301*d*, which may facilitate the servicing of multiple clients 301*a*-301*d*. The device management server 101*a* may be "multi-tenanted", which can allow clients 301*a*-301*d* to access and use the device management server 101*a* without being aware of other clients 301*a*-301*d*.

Figure 3B:
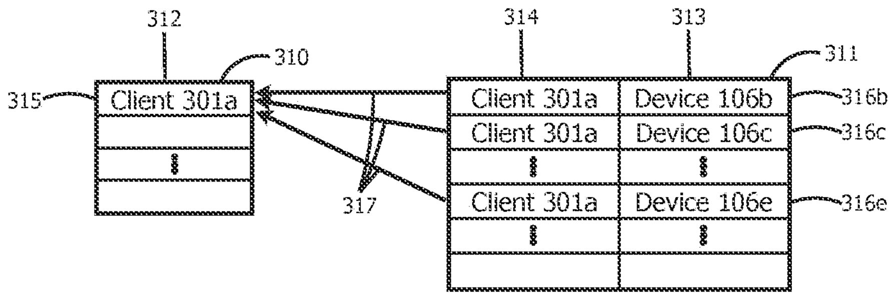
FIG. 3B is an illustrative block diagram of an example embodiment of a data structure describing the partitioning of managed devices by client.

FIG. 3B is an illustrative block diagram of an embodiment of a data structure describing the partitioning of managed devices by client. A row of table 310 can represent one client, and can have a column 312 that references clients. A row of table 311 can represent a single managed device and can have a column 313 that can reference the managed device, and a column 314 that can reference the client where the managed device is located. By way of example, FIG. 3B shows client 301*a* being referenced by row 315 in table 310, and managed devices 106*b*-106*e* being referenced by rows 316*b*-316*e* in table 311; rows 316*b*-316*e* reference managed devices 106*b*-106*e* in column 313 and reference client 301*a* in column 314. As shown in the example in FIG. 3B, a single client 301*a* can be associated with multiple managed devices 106*b*-106*e*, as shown by the many-to-one relationship 317 between table 311 and table 310.

Figure 4A:
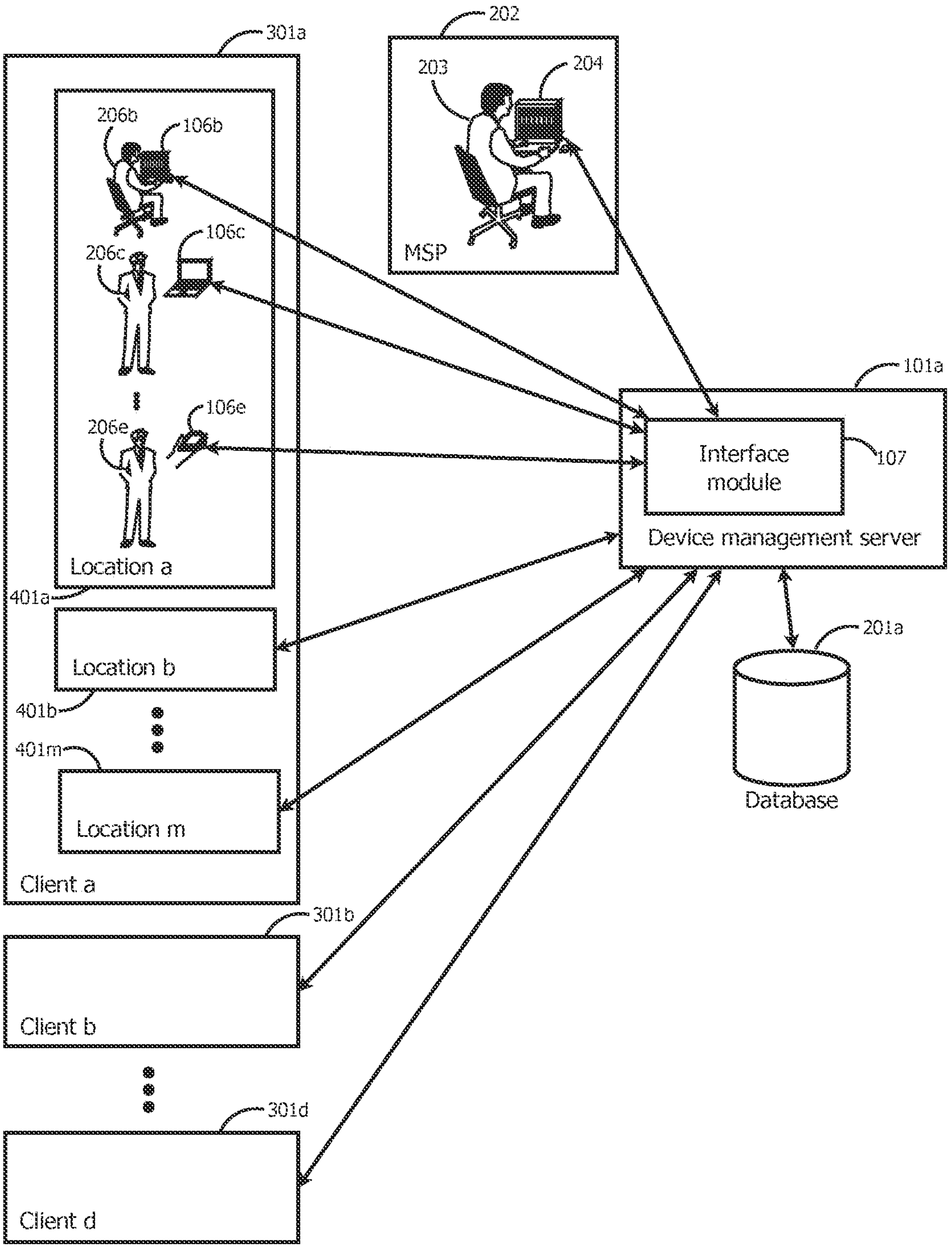
FIG. 4A is an illustrative block diagram of an example embodiment of a device management server and managed devices at multiple locations, within multiple clients.

FIG. 4A is an illustrative block diagram of an embodiment of a device management server and managed devices at multiple locations, within multiple clients. A location 401*a*-401*m* can represent a group of related managed devices 106*b*-106*e* within a client 301*a*-301*d*. In one embodiment, clients 301*a*-301*d* can be used to represent multiple companies, and locations 401*a*-401*m* can be used to represent multiple offices within a single company. A technician 203 at an MSP 202 can use a device 204 to communicate with the interface module 107 on the device management server 101*a*, and can provide monitoring and management functions to managed devices 106*b*-106*e*. The clients 301*a*-301*d* can be internally organized into one or more locations 401*a*-401*m*. Locations 401*a*-401*m* can have one or more managed devices 106*b*-106*e*. Managed devices 106*b*-106*e* can comprise a mix of types, as exemplified in FIG. 4A by managed device 106*b* as a desktop machine, managed device 106*c* as a laptop machine, and managed device 106*e* as a mobile device. Managed devices 106*b*-106*e* may be used by end users 206*b*-206*e* who may benefit from the monitoring and management functions. Managed devices 106*b*-106*e* can connect to the device management server 101*a* to retrieve and execute management functions and to report monitoring results. This structure may be similar at locations 401*a*-401*m*, and the structure of locations 401*a*-401*m* and managed devices 106*b*-106*e* may be similar at clients 301*a*-301*d*. The database 201*a* can be used to keep track of the partitioning of managed devices 106*b*-106*e* by client 301*a*-301*d* and location 401*a*-401*m*, as will be seen with respect to FIG. 4B. The device management server 101*a* can use a database 201*a*, which may facilitate visualizing activities of clients 301*a*-301*d* and locations 401*a*-401*m*, and may facilitate management of clients 301*a*-301*d* and management of multiple locations 401*a*-401*m* of a single client 301*a*. The device management server 101*a* may also facilitate the MSP 202 in consolidating actions and results from locations 401*a*-401*m* within a single client 301*a*-301*d*, which may facilitate the servicing of large clients 301*a*-301*d*. The device management server 101*a* may also facilitate the MSP 202 in consolidating actions and results from clients 301*a*-301*d*, which may facilitate the servicing of multiple clients 301*a*-301*d*. The device management server 101*a* may be "multi-tenanted", which can allow clients 301*a*-301*d* to access and use the device management server 101*a* without being aware of other clients 301*a*-301*d*.

Figure 4B:
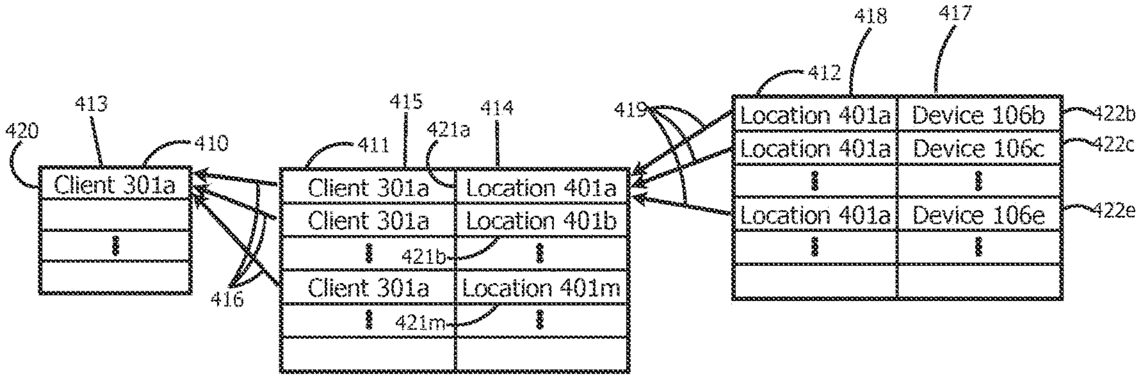
FIG. 4B is an illustrative block diagram of an example embodiment of a data structure describing the partitioning of managed devices by both location and client.

FIG. 4B is an illustrative block diagram of an embodiment of a data structure describing the partitioning of managed devices by both location and client. A row of table 410 can represent one client 301*a*-301*d*, and can have a column 413 that references clients 301*a*-301*d*. A row of table 411 can represent a location 401*a*-401*m* and can have a column 414 that can reference the location 401*a*-401*m*, and a column 415 that can reference the client 301*a*-301*d* associated with the location 401*a*-401*m*. By way of example, FIG. 4B shows client 301*a* in row 420 in table 410, and locations 401*a*-401*m* in rows 421*a*-421*m* in table 411, with the location 401*a*-401*m* in column 414 and the client 301*a* in column 415. A client 301*a* can be associated with multiple locations 401*a*-401*m*, as shown by the many-to-one relationship 416 between table 411 and table 410. A row of table 412 can represent a managed device 106*b*-106*e* and can have a column 417 that can reference the managed device 106*b*-106*e*, and a column 418 that can reference the location 401*a*-401*m* where the managed device 106*b*-106*e* is located. Continuing the example, FIG. 4B shows managed devices 106*b*-106*e* in rows 422*b*-422*e* in table 412, with the managed device 106*b*-106*e* in column 417 and the location 401*a* in column 418. A location 401*a* can have multiple managed devices 106*b*-106*e*, as shown by the many-to-one relationship 419 between table 412 and table 411.

Figure 5A:
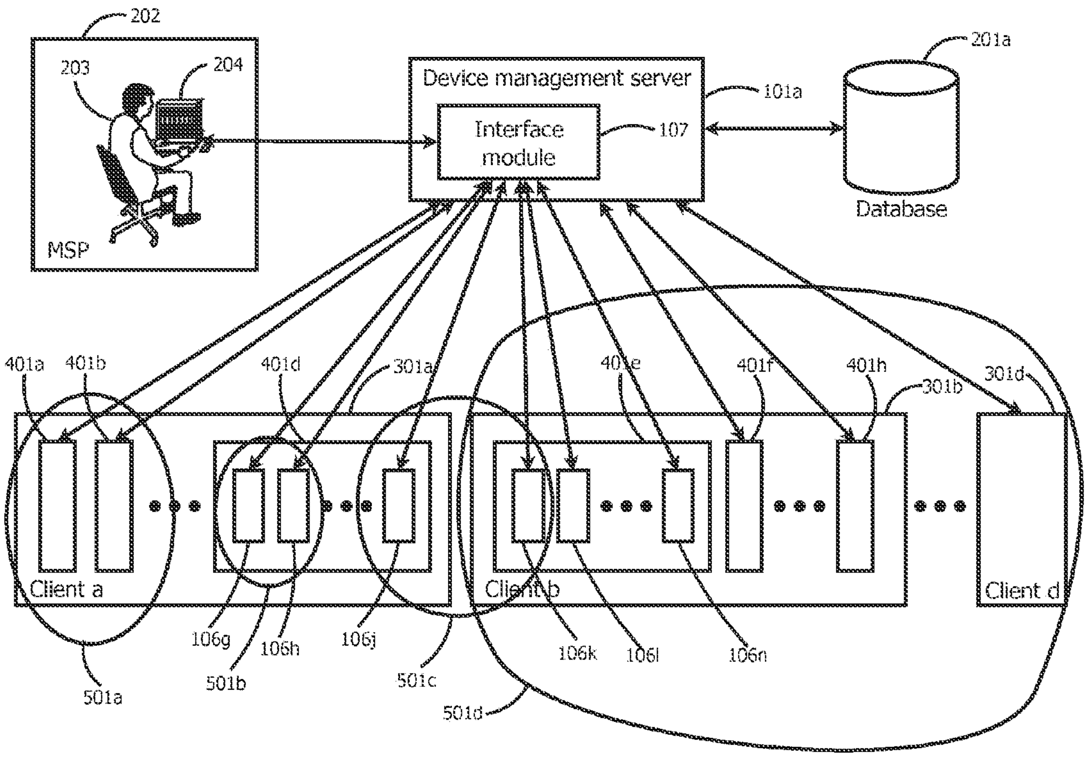
FIG. 5A is an illustrative block diagram of an example embodiment of a device management server and managed devices in multiple groups.

FIG. 5A is an illustrative block diagram of an embodiment of a device management server and managed devices in multiple groups. Device 204 can be configured to communicate with the interface module 107 on the device management server 101*a*. The device management server 101*a* can be configured to provide monitoring and management functions to managed devices 106*g*-106*n*. The device management server 101*a* can be configured to use a database 201*a* to keep track of the structure and content of groups, as will be seen with respect to FIG. 5C. Each client 301*a*-301*d* can have one or more locations 401*a*-401*h*. Each location 401*a*-401*h* can have one or more managed devices 106*g*-106*n*.

In some embodiments, the device management server 101*a* is configured to allow a technician 203 to define and use groups 501*a*-501*d* of managed devices 106*g*-106*n* that can contain a set of one or more managed devices 106*g*-106*n*. For example, the device management server 101*a* may receive, via the interface module 107, an indication to assign one or more managed device 106*g*-106*n* to a new or predefined group 501*a*-501*d*. In some embodiments, the device management server 101*a* may define the groups 501*a*-501*d* of managed devices 106*g*-106*n* using one or more rules or management actions. The device management server 101*a* may execute management actions to and group reporting results from managed devices 106*g*-106*n* in a group 501*a*-501*d*. For example, the management actions may be received as input via an interface module 107. By way of example, FIG. 5A shows several embodiments of groups 501*a*-501*d*. These embodiments are not meant to be limiting, but are instead used to illustrate the concept and utility of groups. In one embodiment, group 501*a* contains the managed devices in locations 401*a* and 401*b*, which may facilitate a situation where locations represent departments in a single office, and the group is used to manage the office. In another embodiment, group 501*b* contains the managed devices 106*g* and 106*h*, which may facilitate a situation where managed devices 106*g* and 106*h* are used for testing, and software updates can be disabled for managed devices 106*g* and 106*h* in order to avoid disrupting the testing process. In still another embodiment, group 501*c* contains managed devices 106*j* and 106*k*, which is a group containing managed devices from more than one location, and may facilitate a situation where the group defines managed devices that are Android smart phones, allowing specific management tasks to be applied to Android smart phones. In yet another embodiment, group 501*d* contains the managed devices in clients 301*b*-301*d*, which may facilitate a situation where the MSP 202 provides a higher class of service to clients in the group.

Managed devices 106*g*-106*n* can be in more than one group 501*a*-501*d*. By way of example, FIG. 5A shows managed device 106*k* in both group 501*c* and group 501*d*. Having a single device 106*k* in more than one group 501*c*-501*d* can lead to ambiguities when different management configurations are applied to group 501*c* and group 501*d*. The device management server 101*a* can facilitate resolving these ambiguities by following rules about the order in which management configurations are applied to multiple groups, and the priority for management configurations that are applied to managed devices 106*k* that are in more than one group 501*c*-501*d*. In one embodiment, the device level configuration for group 501*c* can override the client level configuration for group 501*d*, so that the configuration associated with group 501*c* is applied to managed device 106*k*, instead of the configuration associated with group 501*d*. This embodiment can facilitate a situation where group 501*d* is used to apply updates twice a week, for a higher level of service, but group 501*c* is used to apply security updates on server machines once per day. In this situation, the more frequent application of security updates specified by group 501*c* can apply to servers that are receiving the higher level of service, since server machines can be more vulnerable to external attacks.

Figure 5B:
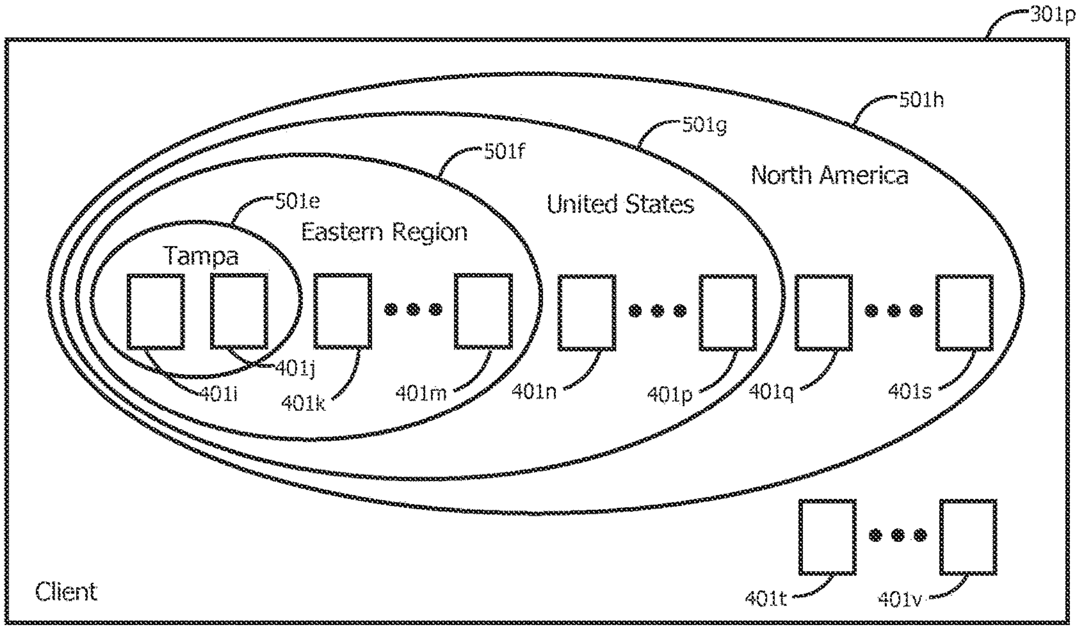
FIG. 5B is an illustrative block diagram of an example embodiment of managed devices in multiple hierarchical groups.

FIG. 5B is an illustrative block diagram of an embodiment of managed devices in multiple hierarchical groups. In one embodiment, client 301*p* is a multi-national company, in which two locations 401*i* and 401*j* can represent two offices in the city of Tampa. In this embodiment, locations 401*i* and 401*j* are in group 501*e*, which can represent the city of Tampa. In this embodiment, group 501*e*, along with other locations 401*k*-401*m* can make up the Eastern Region, which can be represented by group 501*f*. In this embodiment, group 501*f*, along with additional locations 401*n*-401*p*, can make up the United States, which can be represented by group 501*g*. In this embodiment, group 501*g*, along with additional locations 401*q*-401*s*, can make up the North American region, which can be represented by group 501*h*. In this embodiment, group 501*h*, along with additional locations 401*t*-401*v*, can make up the entire company, which can be represented as client 301*p*. This embodiment illustrates how groups 501*e*-501*h* can represent a hierarchical organization, which may facilitate management, reporting, and billing. Groups do not need to be hierarchical, and in fact, hierarchical groups as illustrated with respect to FIG. 5B can exist side by side with non-hierarchical groups as illustrated with respect to FIG. 5A.

Figure 5C:
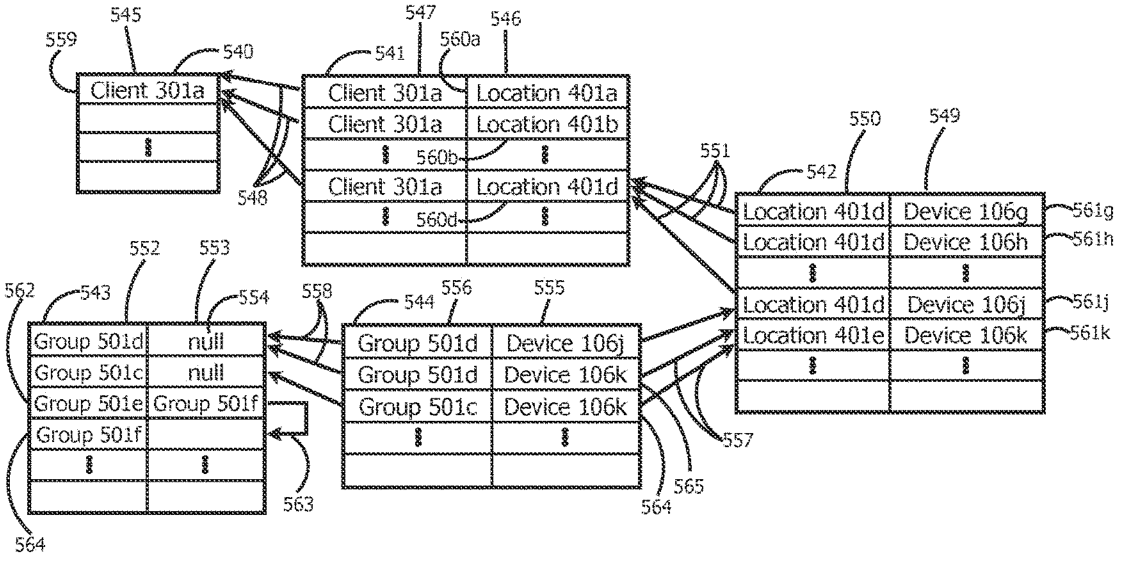
FIG. 5C is an illustrative block diagram of an example embodiment of a data structure describing the structure and content of groups of managed devices.

FIG. 5C is an illustrative block diagram of an embodiment of a data structure describing the structure and content of groups of managed devices. A row of table 540 can represent a client 301*a*-301*p*, and can have a column 545 that references clients 301*a*-301*p*. A row of table 541 can represent a single location 401*a*-401*v* and can have a column 546 that references the location 401*a*-401*v*, and a column 547 that references the client 301*a*-301*p* that is associated with the location 401*a*-401*v*. By way of example, FIG. 5C shows client 301*a* in row 559 in table 540, and locations 401*a*-401*d* in rows 560*a*-560*d* in table 541 referencing the location 401*a*-401*d* in column 546 and referencing the client 301*a* in column 547. A client 301*a* can have multiple locations 401*a*-401*d*, as shown by the many-to-one relationship 548 between table 541 and table 540. A row of table 542 can represent a managed device 106*g*-106*n* and can have a column 549 that can reference the managed device 106*g*-106*n*, and a column 550 that can reference the location 401*a*-401*v* where the managed device 106*g*-106*n* is located. Continuing the example, managed devices 106*g*-106*j* are in rows 561*g*-561*j* in table 542 that references managed devices 106*g*-106*j* in column 549 and references location 401*d* in column 550; managed device 106*k* is in row 561*k* in table 542 that references managed device 106*k* in column 549 and references location 401*e* in column 550. A location 401*d* can have multiple managed devices 106*g*-106*j*, as shown by the many-to-one relationship 551 between table 542 and table 541.

Tables 543 and 544 can represent the structure and content of groups 501*a*-501*h*. A row of table 543 can represents a group and can have a column 552 that can reference the group 501*a*-501*h*, and a column 553 that can reference the parent group 501*a*-501*h*. For a group 501*e*-501*h* that is in a hierarchy, column 553 can refer to the group 501*e*-501*h* one level up in the hierarchy. By way of example, FIG. 5C shows the row 562 for the Tampa group 501*e* with a reference in column 553 that refers 563 to the row 564 for the Eastern Region group 501*f*, which is the parent group for the Tampa group 501*e*. For a group 501*a*-501*h* that is at the top level of the hierarchy, or not in any hierarchy, column 553 can have a special "null" value 554 indicating that there is no parent group. A row of table 544 can represent the membership of a managed device 106*g*-106*n* in a group 501*a*-501*h*, and can have a column 555 that can reference the managed device 106*g*-106*n*, and a column 556 that can reference the group 501*a*-501*h*. Continuing the example, managed device 106*k* is in both group 501*c* and 501*d*, so one row 564 of table 544 references managed device 106*k* in column 555 and group 501*c* in column 556, and another row 565 of table 544 references managed device 106*k* in column 555 and group 501*d* in column 556. A managed device 106*k* can be in more than one group 501*c*-501*d* by appearing in column 555 of more than one row of table 544, as shown by the many-to-one relationship 557 between table 544 and table 542. A group 501*d* can contain more than one managed device 106*j*-106*k* by appearing in column 556 of more than one row of table 544, as shown by the many-to-one relationship 558 between table 544 and table 543.

Figure 6:
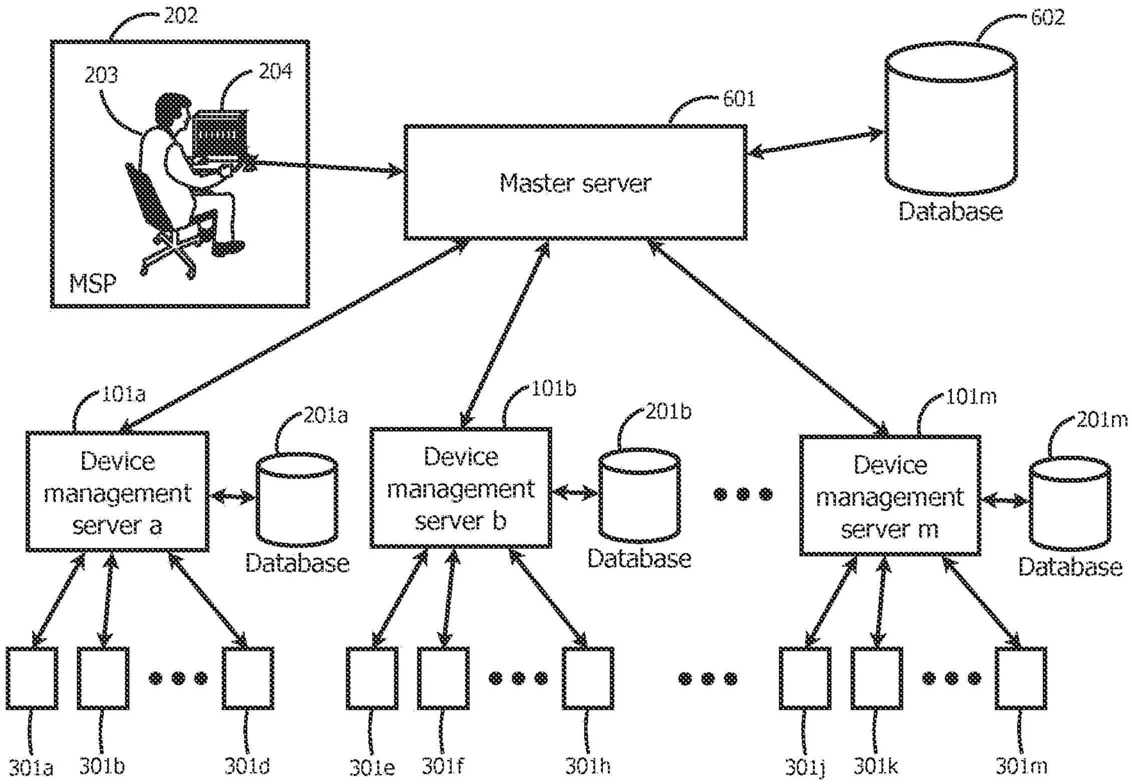
FIG. 6 is an illustrative block diagram of an example embodiment of multiple device management servers and locations with managed devices.

FIG. 6 is an illustrative block diagram of an embodiment of multiple device management servers and locations with managed devices. The management system can be partitioned into multiple device management servers 101*a*-101*m*, can have databases 201*a*-201*m*, and can be connected to managed devices at clients 301*a*-301*m*. The managed devices can connect to the device management servers 101*a*-101*m* to retrieve and execute management functions and to report monitoring results. The technician 203 at the MSP 202 can use a device 204 that can connect to a master server 601 that can have a database 602. The master server 601 can connect to device management servers 101*a*-101*m* to send management functions to the managed devices and retrieve monitoring results from the managed devices. The load on any one device management server 101*a*-101*m* may be reduced by partitioning the clients 301*a*-301*m*. By way of example, FIG. 6 shows that clients 301*a*-301*d* can connect to device management server 101*a*, clients 301*e*-301*h* can connect to device management server 101*b*, and clients 301*j*-301*m* can connect to device management server 101*m*.

Figure 7:
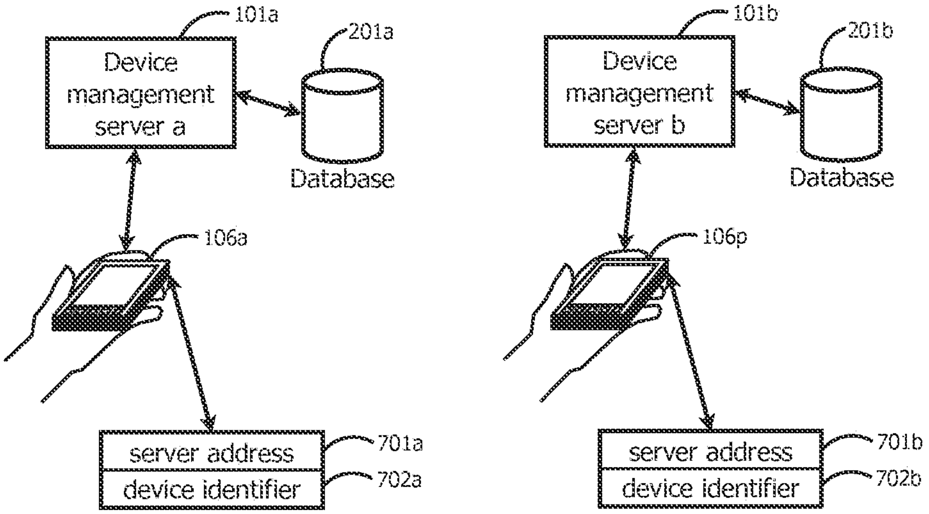
FIG. 7 is an illustrative block diagram of an example embodiment of configuration information for managed devices connected to two device management servers.

FIG. 7 is an illustrative block diagram of an embodiment of configuration information for managed devices connected to two device management servers. Managed devices 106*a* and 106*p* can have configuration information that is specific to the device, which can include the address 701*a*-701*b* of the device management server 101*a*-101*b* associated with the managed device 106*a* and 106*p*, and the device identifier 702*a*-702*b* for the managed device 106*a* and 106*p*. When managed device 106*a* communicates with device management server 101*a*, device management server 101*a* can use the device identifier 702*a* to retrieve the client, location, and groups for managed device 106*a*, as well as other information that is specific to managed device 106*a*, using the database 201*a* and any other information storage, and can take appropriate management actions. When managed device 106*p* communicates with device management server 101*b*, device management server 101*b* can use the device identifier 702*b* to retrieve the client, location, and groups for managed device 106*p*, as well as other information that is specific to managed device 106*p*, using the database 201*b* and any other information storage, and can take appropriate management actions.

Figure 8:
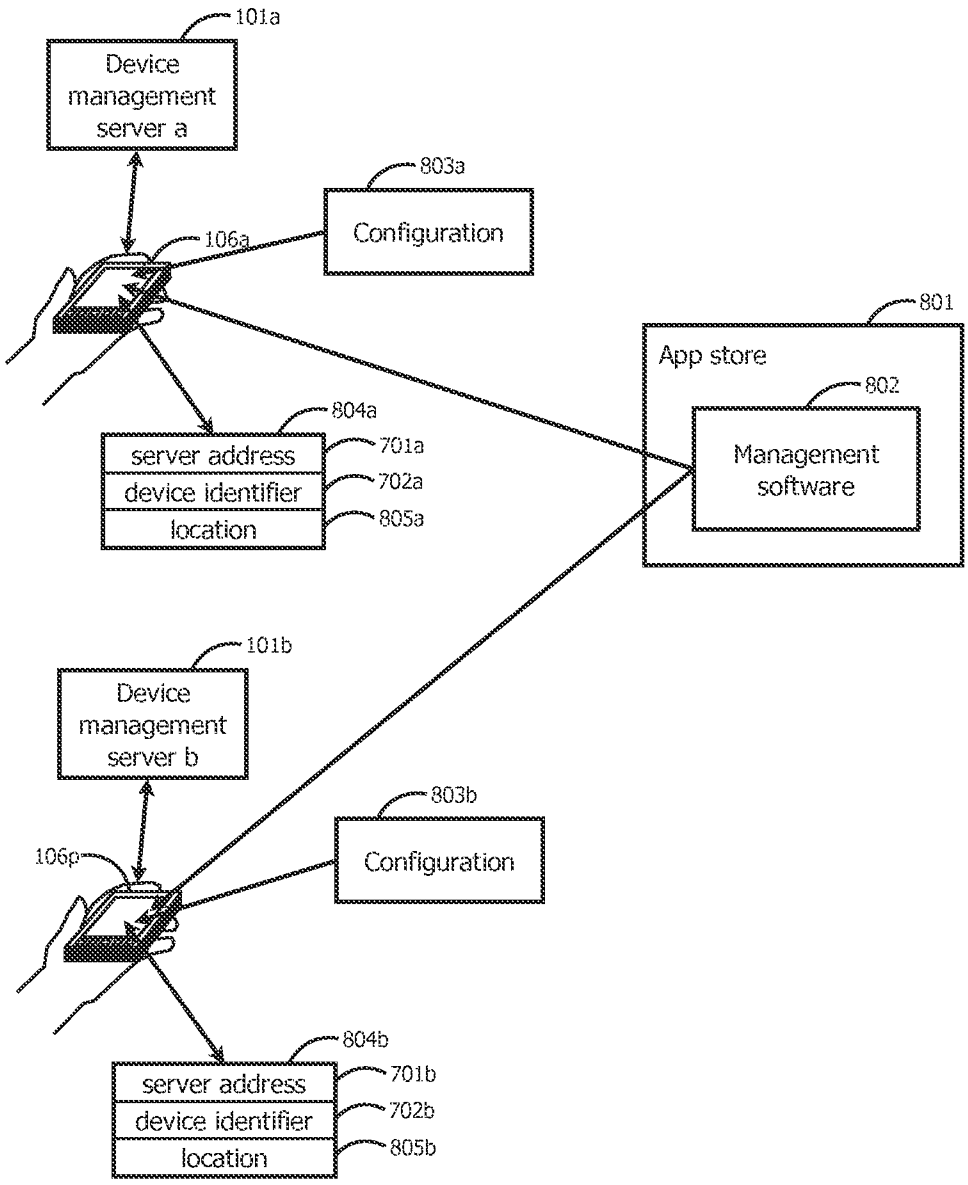
FIG. 8 is an illustrative block diagram of an example embodiment of managed devices connected to two device management servers with management software from a source.

FIG. 8 is an illustrative block diagram of an embodiment of managed devices connected to two device management servers with management software from a single source. Managed devices 106*a* and 106*p* can use addresses 701*a*-701*b* of device management servers 101*a*-101*b* in order to connect to device management servers 101*a*-101*b*, and can use device identifiers 702*a*-702*b* for managed devices 106*a* and 106*p* in order to identify managed devices 106*a* and 106*p* to device management servers 101*a*-101*b*. The first time that managed devices 106*a* and 106*p* connect to device management servers 101*a*-101*b*, device management servers 101*a*-101*b* may need to determine which location 401*a*-401*v* managed devices 106*a* and 106*p* are associated with. It may be impractical to configure every location 401*a*-401*v* for every managed device 106*a*-106*n* on device management servers 101*a*-101*b* prior to this first connection; for example, the device identifier 702*a*-702*b* may not be known prior to this first connection. It may be advantageous for managed devices 106*a* and 106*p* to store locations 805*a*-805*b* prior to the first connection to device management servers 101*a*-101*b*. Device management servers 101*a*-101*b* may be a single device management server, or multiple device management servers.

Managed devices 106*a* and 106*p* may be restricted to install management software 802 from a single app store 801. This paradigm for software installation may be to facilitate security, and to facilitate control over the introduction of malicious software. When the same management software 802 is installed on both managed devices 106*a* and 106*p*, the values for the device management server address 701*a*-701*b*, the device identifier 702*a*-702*b*, and the location 805*a*-805*b* may need to come from a source other than the management software 802. The device identifiers 702*a*-702*b* may be generated by the managed devices 106*a* and 106*p*.

When the management software 802 is installed from the app store 801 on managed devices 106*a* and 106*p*, configurations 803*a*-803*b* for managed devices 106*a* and 106*p* can be applied to managed devices 106*a* and 106*p* by the management software 802. Configurations 803*a*-803*b* can set up parameters 804*a*-804*b* for the managed devices 106*a* and 106*p*. Parameters 804*a*-804*b* can include the addresses 701*a*-701*b* of device management servers 101*a*-101*b* and the locations 805*a*-805*b* of managed devices 106*a* and 106*p*. With configurations 803*a*-803*b* and parameters 804*a*-804*b*, managed device 106*a* can connect with device management server 101*a* and communicate location 805*a*, and managed device 106*p* can connect with device management server 101*b* and communicate location 805*b*.

Figure 9:
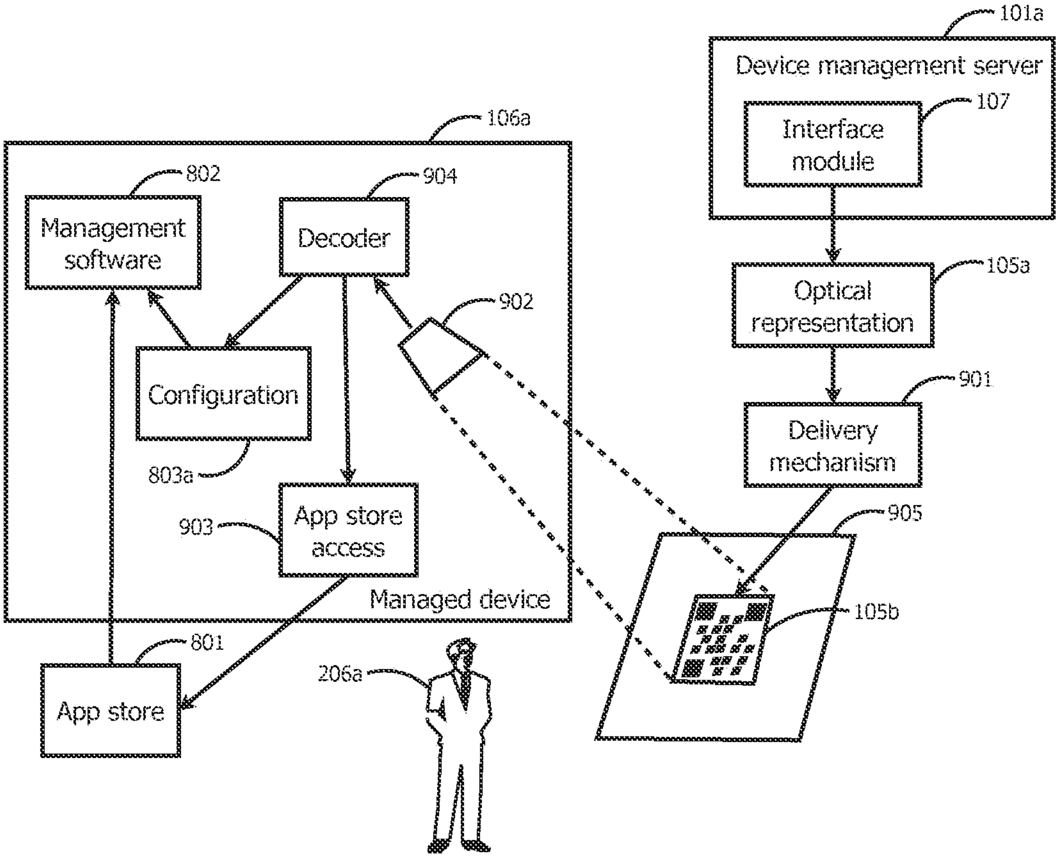
FIG. 9 is an illustrative block diagram of an example embodiment of a system for configuring a managed device using an optical representation of a configuration.

FIG. 9 is an illustrative block diagram of an embodiment of a system for configuring a managed device using an image. The interface module 107 of the device management server 101*a* can generate an optical representation 105*a* of a configuration. The optical representation 105*a* can be transferred via a delivery mechanism 901 to a display 905 of an optical representation 105*b* of the configuration. The optical representation 105*b* can be visible to the end user 206*a* of a managed device 106*a*. The end user 206*a* can direct an imaging device 902 onto the display 905, and the imaging device 902 can transfer the image 105*b* to a decoder 904. The decoder 904 can extract a configuration 803*a* from the image 105*b*, and can provide the configuration 803*a* to the management software 802. The management software 802 can use the configuration 803*a* to set up parameters for the managed device 106*a*, as previously described with respect to FIG. 8. The decoder 904 may extract additional information from the image 105*b*; for example, the decoder 904 may extract app store access information 903 that can be used to access the app store 801 to install the management software 802.

In one embodiment, the optical representation 105*a* can be a QR code, the delivery mechanism 901 can be a web site, the device management server 101*a* can provides a link to the site to the end user 206*a* in an email, the end user can use a web browser with the link, the display 905 can be a computer display on a desktop machine driven by the browser, the imaging device 902 can be a camera built into a smart phone, the decoder 904 can be a QR code reader application on the smart phone that can decode the configuration 803*a* and provide the configuration 803*a* to the management software 802, and the app store access information 903 can be a Uniform Record Locator (URL) that can direct the smart phone browser to the app store 801 to download and install the management software 802 prior to applying the configuration 803*a*.

In another embodiment, the imaging device 902 can be an external camera communicatively coupled to the managed device 106*a*. In various embodiments, the imaging device 902 can be communicatively coupled to the managed device 106*a* via a wired or wireless communications link.

In still another embodiment, the optical representation 105*a* can be a linear bar code, the delivery mechanism 901 can be printing the bar code onto marketing promotional material and sending it to the end user 206*a* using regular postal mail, the display 905 can be the paper with the promotional material on it, the imaging device 902 can be a camera built into a smart phone, the decoder 904 can be a bar code reader application on the smart phone that can decode the configuration 803*a* and provide the configuration 803*a* to the management software 802, and the app store access information 903 can be a URL that can direct the smart phone browser to the app store 801 to download and install the management software 802 prior to applying the configuration 803*a*.

In yet another embodiment, the optical representation 105*a* can be a picture that uses digital image steganography or digital watermarks to encode the configuration; this embodiment may facilitate making the optical representation 105*a* less disruptive in marketing materials.

In still a further embodiment, the configuration 803*a* may be a URL that can be used to retrieve the actual configuration information; this embodiment may facilitate updating the configuration information dynamically, and may facilitate tracking and controlling access to the configuration information.

Figure 10:
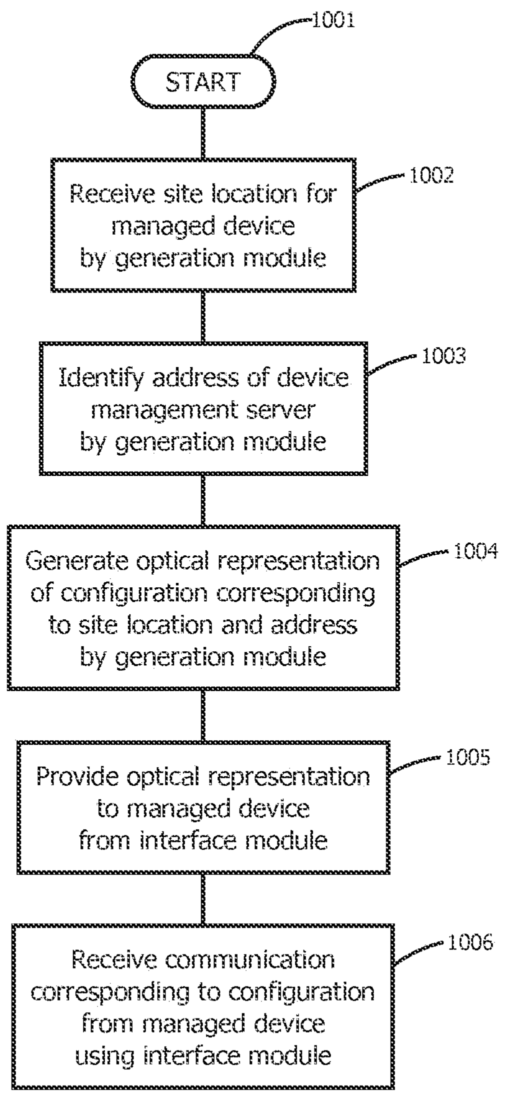
FIG. 10 is an illustrative flowchart depicting an example embodiment of a method of managing a computing device using an optical representation of a configuration.

FIG. 10 is an illustrative flowchart depicting an example embodiment of a method of managing a computing device using an image. The computing device can be a managed device that is managed by a device management server. In brief overview, the method 1001 can include receiving a site location for the managed device by a generation module (1002). The method 1001 can include identifying an address of the device management server by the generation module (1003). The method 1001 can include generating, by the generation module, an optical representation of a configuration corresponding to the site location and the address (1004). The method 1001 can include providing the optical representation to the managed device from the interface module (1005). The method 1001 can include receiving a communication corresponding to the configuration from the managed device, using the interface module (1006).

In further detail, the method 1001 includes a generation module receiving a site location for a managed device (1002). In some embodiments, the generation module receives the site location by accessing a data structure stored in a memory element communicatively coupled to the generation module. In some embodiments, the generation module receives the site location via an interface communicatively coupled to the generation module. In some embodiments, the generation module receives an indication to obtain the site location for a managed device, which the generation module may then obtain via a data structure or other data source accessible to the generation module. In some embodiments, the generation module may determine the site location based on information associated with the managed device. For example, the generation module may determine a geographic location of the managed device, and further determine a corresponding site location associated with the geographic location. In some embodiments, the generation module receives the site location from a managed device. In some embodiments, the location may be associated with a particular entity, for example, a business unit.

In some embodiments, the method 1001 includes a generation module identifying an address of a device management server (1003). In some embodiments, the address includes at least one of an IP address, a domain name, a URL, and a machine name. In some embodiments, the address can be used by a managed device to contact the device management server. For example, the generation module may obtain the network address of the device management server from the operating system of the device management server.

In some embodiments, the method 1001 includes a generation module generating an optical representation of a configuration corresponding to the site location and address (1004). In some embodiments, the optical representation includes at least one of a QR code, a one-dimensional barcode, a stacked barcode, a two-dimensional barcode, a Data Matrix code, a steganographic image, an Aztec code, a high capacity color barcode, a MaxiCode, and a SPARQ-code. For example, the optical representation may be an image. In some embodiments, the configuration may be a URL that can be used to retrieve the actual configuration information.

In some embodiments, the method 1001 includes an interface module providing an optical representation to a managed device (1005). In some embodiments, the providing of the optical representation to the managed device includes at least one of displaying the optical representation on a web page, embedding the optical representation in an email message, embedding the optical representation in a multimedia message service (MMS) message, and printing the optical representation on a physical medium. In some embodiments, the optical representation can be communicated to the end user in charge of setting up the managed device. In some embodiments, the optical representation can be scanned by the managed device during the setup of a management software. For example, the optical representation may be visible to the end user of the managed device, and the optical representation may be scanned by a camera that is built into the managed device or connected to the managed device through an external interface. In some embodiments, the configuration may be used to update the configuration of the managed software on the managed device.

In some embodiments, the method 1001 includes an interface module receiving, from a managed device, a communication corresponding to a configuration (1006). In some embodiments, the communication corresponding to the configuration includes at least one of an acknowledgement message, the site location, a device identifier for the computing device, one or more of a hardware configuration of the computing device, and one or more of a software configuration for the computing device. In some embodiments, the communication can identify the managed device to the device management server as being available to offer management functions for the managed device. In some embodiments, the device identifier may be generated by the managed device.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

While this specification contains many specific implementation details, these should not be construed as limitations on the scope of any inventions or of what may be claimed, but rather as descriptions of features specific to particular implementations of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system for cloud-based performance management of computing devices to improve performance of the computing devices, comprising:

a cloud comprising one or more processors and memory configured to:

receive, for a computing device, a geographic site location selected from a plurality of locations in a hierarchical geographic organization data structure, the geographic site location different from a location of the cloud;

determine an identifier of the cloud that is different from the geographic site location for the computing device;

combine the identifier of the cloud with the geographic site location that is different from the location of the cloud;

select a configuration from a plurality of configurations based on a combination of the geographic site location and the identifier of the cloud;

generate an optical representation of the configuration selected based on the combination of the geographic site location and the identifier of the cloud;

provide the optical representation of the configuration, the optical representation of the configuration to cause the computing device to generate and send, to the cloud, a communication corresponding to the configuration;

receive the communication corresponding to the configuration from the computing device; and transmit, responsive to receiving the communication from the computing device, the configuration corresponding to the optical representation selected based on the combination of the geographic site location and the identifier of the cloud to cause the computing device to update a stored configuration on the computing device with the configuration, wherein the update to the stored configuration improves performance of the computing device.

2. The system of claim 1, wherein the cloud is further configured to:

access a data structure comprising the geographic site location and an entity; and select the configuration from the plurality of configurations based on the entity.

3. The system of claim 1, wherein the cloud is further configured to:

access a data structure comprising the geographic site location and business unit; and select the configuration from the plurality of configurations based on the business unit.

4. The system of claim 1, wherein the cloud is further configured to:

access a data structure comprising the geographic site location and a type of the computing devices; and select the configuration from the plurality of configurations based on the type of the computing devices.

5. The system of claim 1, wherein the identifier for the cloud comprises at least one of an IP address, a domain name, or a URL.

6. The system of claim 1, wherein the optical representation comprises at least one of a QR code, a one-dimensional barcode, a stacked barcode, a two-dimensional barcode, a Data Matrix code, a steganographic image, an Aztec code, a high capacity color barcode, a MaxiCode, or a SPARQcode.

7. The system of claim 1, wherein the cloud is further configured to:

receive, from a managed service provider device, the hierarchical geographic organization data structure.

8. The system of claim 1, wherein the cloud is further configured to:

receive, from a managed service provider device, an indication of the computing device to be managed by a managed service provider.

9. The system of claim 1, wherein the cloud is further configured to:

receive, responsive to the optical representation of the configuration scanned by a plurality of computing devices managed by a managed service provider, a plurality of communications corresponding to the configuration.

10. The system of claim 1, wherein the cloud is further configured to:

display the optical representation of the configuration via a web page.

11. A method of cloud-based performance management of computing devices to improve performance of the computing devices, comprising:

receiving, by a cloud comprising one or more processors and memory, for a computing device, a geographic site location selected from a plurality of locations in a hierarchical geographic organization data structure, the geographic site location different from a location of the cloud;

determining, by the cloud, an identifier of the cloud that is different from the geographic site location for the computing device;

combining, by the cloud, the identifier of the cloud with the geographic site location that is different from the location of the cloud;

selecting, by the cloud, a configuration from a plurality of configurations based on a combination of the geographic site location and the identifier of the cloud;

generating, by the cloud, an optical representation of the configuration selected based on the combination of the geographic site location and the identifier of the cloud;

providing, by the cloud, the optical representation of the configuration, the optical representation of the configuration to cause the computing device to generate and send, to the cloud, a communication corresponding to the configuration;

receiving, by the cloud, the communication corresponding to the configuration from the computing device; and transmitting, by the cloud, responsive to receiving the communication from the computing device, the configuration corresponding to the optical representation selected based on the combination of the geographic site location and the identifier of the cloud to cause the computing device to update a stored configuration on the computing device with the configuration.

12. The method of claim 11, comprising:

accessing a data structure comprising the geographic site location and an entity; and selecting the configuration from the plurality of configurations based on the entity.

13. The method of claim 11, comprising:

accessing a data structure comprising the geographic site location and business unit; and selecting the configuration from the plurality of configurations based on the business unit.

14. The method of claim 11, comprising:

accessing a data structure comprising the geographic site location and a type of the computing devices; and selecting the configuration from the plurality of configurations based on the type of the computing devices.

15. The method of claim 11, wherein the identifier for the cloud comprises at least one of an IP address, a domain name, or a URL.

16. The method of claim 11, wherein the optical representation comprises at least one of a QR code, a one-dimensional barcode, a stacked barcode, a two-dimensional barcode, a Data Matrix code, a steganographic image, an Aztec code, a high capacity color barcode, a MaxiCode, or a SPARQcode.

17. The method of claim 11, comprising:

receiving, from a managed service provider device, the hierarchical geographic organization data structure.

18. The method of claim 11, comprising:

receiving, from a managed service provider device, an indication of the computing device to be managed by a managed service provider.

19. The method of claim 11, comprising:

receiving, responsive to the optical representation of the configuration scanned by a plurality of computing devices managed by a managed service provider, a plurality of communications corresponding to the configuration.

20. The method of claim 11, comprising:

displaying the optical representation of the configuration via a web page.

* * * * *